Dec. 19, 1933.  F. E. SCHWENTLER  1,939,926
TRUCK BRAKE RIGGING
Filed July 10, 1931   2 Sheets-Sheet 1
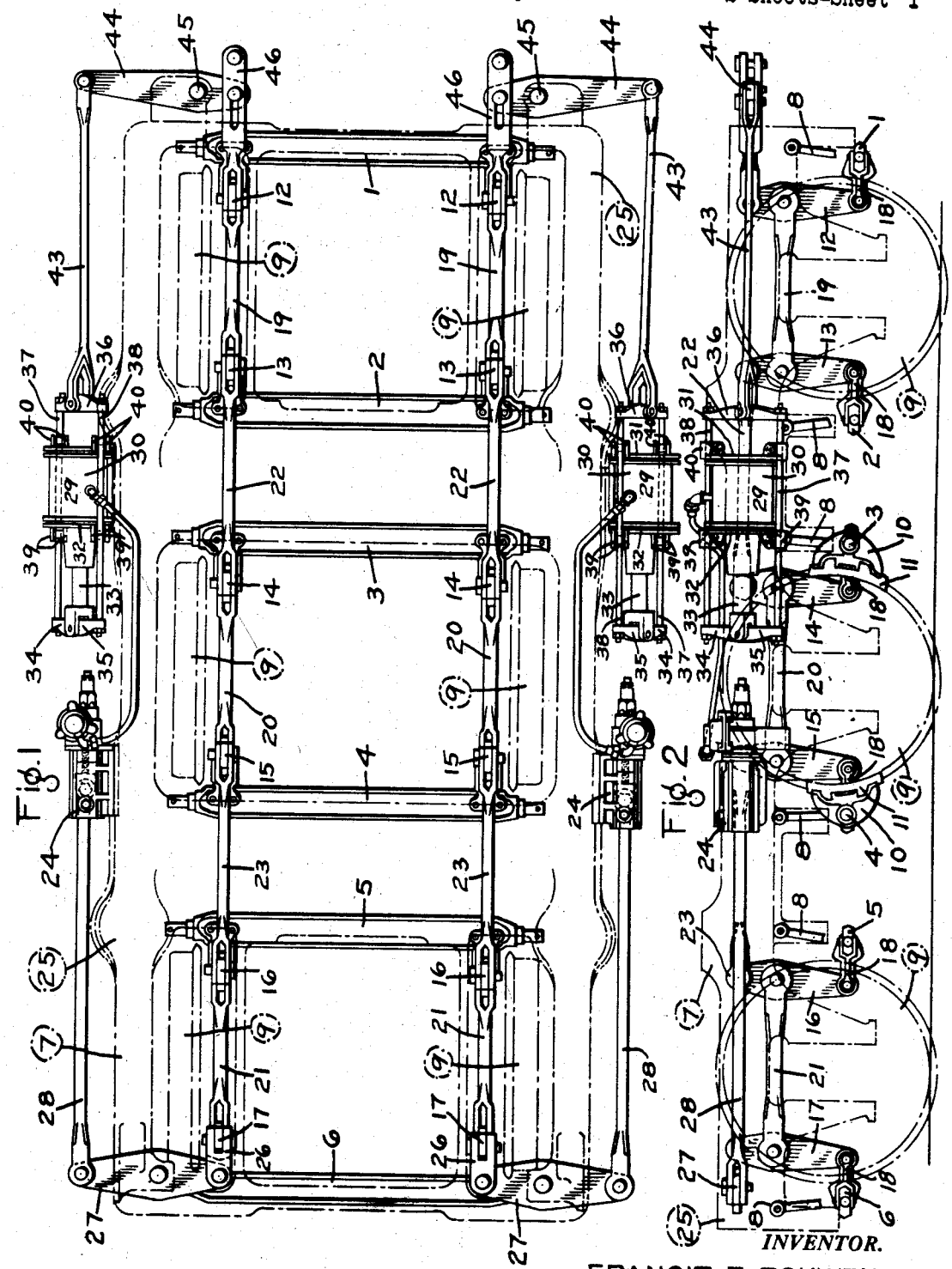
INVENTOR.
FRANCIS E. SCHWENTLER
By
Wm. M. Cady
ATTORNEY.

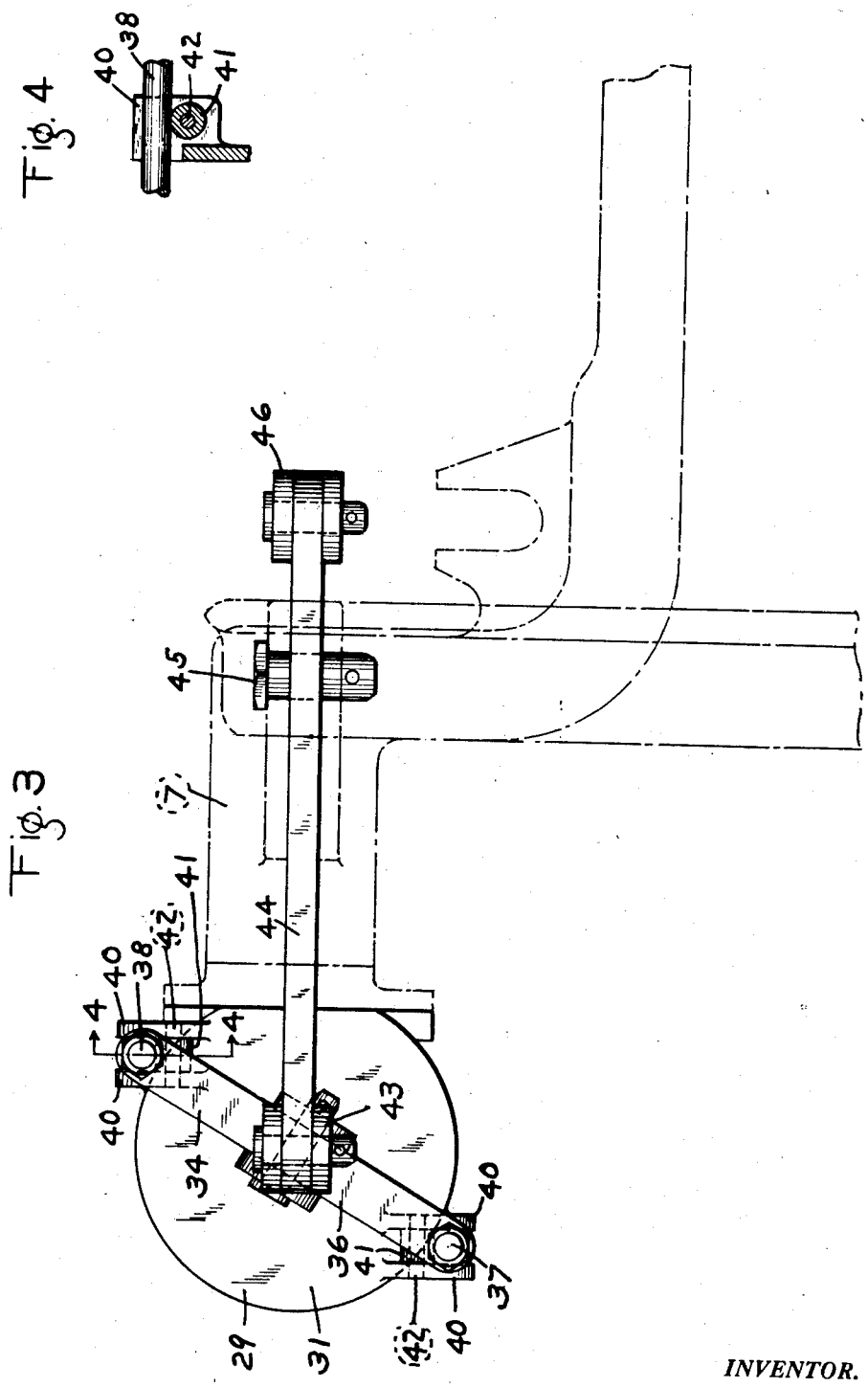

Patented Dec. 19, 1933

1,939,926

UNITED STATES PATENT OFFICE 1,939,926

TRUCK BRAKE RIGGING

Francis E. Schwentler, St. Louis, Mo., assignor to The American Brake Company, St. Louis, Mo., a corporation of Missouri Application July 10, 1931. Serial No. 549,819

8 Claims. (Cl. 188—46)

This invention relates to railway brake equipment and more particularly to that type in which the member operatively connecting the brake cylinder to the other parts of the equipment extends rearwardly from the outer end of the brake cylinder piston rod past the brake cylinder to a point beyond the pressure head of the brake cylinder, and an object of my invention is to provide the brake cylinder with a guide or guides for maintaining said member in its proper position.

Another object of the invention is to provide an improved truck brake system having a single brake cylinder lever pivotally mounted on one end of a truck frame and operatively connecting the push rod of a brake cylinder device mounted on one of the side members of the truck frame with a live lever of the system and having a single adjusting or fulcrum lever pivotally on the other end of the truck frame and operatively connecting a slack adjuster, secured to the same side member of the truck frame, with a dead lever of the system.

Other objects and advantages will appear in the following more detailed description of the invention.

In the accompanying drawings; Fig. 1 is a plan view of a truck brake equipment embodying my invention, the truck frame and wheels being shown in dot and dash lines and the usual brake heads and shoes being omitted; Fig. 2 is a side elevational view of the same, the brake heads and shoes being shown applied to one of the truck wheels; Fig. 3 is an enlarged end elevational view of a portion of the equipment; and Fig. 4 is a fragmentary sectional view taken on the line 4—4 of Fig. 3.

In the drawings, I have illustrated my invention in connection with a truck brake equipment comprising brake beams 1, 2, 3, 4, 5 and 6 which, adjacent their ends, are supported from a truck frame 7 by the usual hangers 8. These brake beams are arranged one on each side of each pair of the truck wheels 9 and each beam carries a brake head 10 to which a brake shoe 11 is secured for engagement with the tread of one of the wheels 9.

The equipment also comprises two sets of operatively connected rods and levers which may be supported upon the truck frame in the usual manner. One of these sets is arranged at either side of the truck and comprises vertically disposed live levers 12, 13, 14, 15 and 16 and a dead lever 17, each of which at its lower end, is operatively connected to an adjacent brake beam by a clevis connection 18.

The levers 12 and 13 are operatively connected together intermediate their ends by a rod 19 and the levers 14 and 15, and 16 and 17 are connected together in a like manner by rods 20 and 21, respectively.

The upper ends of the levers 13 and 14, and 15 and 16 are operatively connected together by rods 22 and 23, respectively.

The upper end of the dead lever 17 is fulcrumed to a slack adjuster 24 secured to one of the side members 25 of the truck frame through the medium of a clevis connection 26, a fulcrum lever 27 pivotally mounted on one end of the truck frame and a rod 28 pivotally connected to the fulcrum lever and the slack adjuster.

For operating each set of operatively connected levers and rods, a brake cylinder 29 is provided having a cylinder casing portion 30 secured directly to the above referred to side member 25 of the truck frame. A pressure head 31 is secured to one end of the cylinder portion 30 and a non-pressure head 32 is secured to the other end. Contained in the cylinder portion 30 is the usual brake cylinder piston having a stem or push rod 33 which extends through a central opening in the non-pressure head 32.

The brake cylinder 29 is surrounded by a yoke 34 having end pieces 35 and 36 and spaced side rods 37 and 38 which are secured to said end pieces and are each received between spaced guide lugs 39 formed on the non-pressure head 32 of the brake cylinder and between spaced lugs 40 formed on the pressure head 31 of the brake cylinder, said rods being adapted to engage rollers 41 rotatably mounted on pins 42 secured to the lugs.

The brake cylinder push rod 33 is pivotally connected to the end piece 35 of the yoke and one end of a pull rod 43 is pivotally connected to the end piece 36 of the yoke, the other end of the pull rod being pivotally connected to the outer end of a horizontally disposed lever 44 which is pivotally connected, intermediate its ends, to the truck frame by means of a pin 45.

The inner end of the lever 44 is pivotally connected to the outer end of a rod 46, the inner end of the rod being pivotally connected to the upper end of the live lever 12.

The guide lugs 39 and 40 are so disposed about the brake cylinder that the yoke will be maintained at an angle of about 45 degrees from the vertical, so that the several parts of the yoke will clear the truck frame and at the same time permit the brake cylinder to be positioned very close to the outer surface of the side member 25 to which it is secured. By this construction it will be seen that the brake cylinder and yoke surrounding it will take up a minimum amount of space and thus maintain the best possible clearance conditions between the truck frame and adjacent parts of a car body supported upon the truck frame.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a truck brake equipment, the combination with a truck frame having side members, of a system of operatively connected brake elements carried by said truck frame, one of said elements being a dead lever and another being a live lever, a brake cylinder device secured to one of said side members, a slack adjuster secured to the same side member, a single brake cylinder lever pivotally mounted on one end of the truck frame operatively connecting the brake cylinder device and live lever, and a single lever pivotally mounted on the other end of the truck frame operatively connecting said slack adjuster and dead lever.

2. In a truck brake equipment, the combination with a truck frame having side members, of a system of operatively connected brake elements carried by said truck frame and including a dead lever, a slack adjusting device secured to one of said side members, and a single lever pivotally mounted on one end of the truck frame operatively connecting said slack adjusting device and dead lever.

3. In a truck brake equipment, the combination with a truck frame having side members, of a system of operatively connected brake elements carried by said truck frame and including a dead lever constituting one end of said system, a slack adjusting device secured to one of said side members, and a single lever pivotally mounted on the truck frame operatively connecting said slack adjusting device and dead lever.

4. In a truck brake equipment, the combination with a truck frame having side members, of a system of operatively connected brake elements carried by said truck frame, one of said elements being a dead lever and another being a live lever, said dead lever constituting one end of said system and said live lever constituting the other end of the system, a brake cylinder device secured to one of said side members, a slack adjuster secured to the same side member, a single brake cylinder lever pivotally mounted on the truck frame operatively connecting said brake cylinder device and live lever, and a single lever pivotally mounted on the truck frame and operatively connecting said slack adjuster and dead lever.

5. In a truck brake equipment, the combination with a truck frame having side members, of a system of operatively connected brake elements carried by the truck frame and including a live brake lever, a brake cylinder device secured to one of said side members, a brake cylinder lever pivotally mounted on the truck frame and operatively connected at one end to the live lever, a pull rod operatively connected to the other end of said brake cylinder lever, a member operatively connecting the brake cylinder device to the pull rod, and means integral with the brake cylinder device for guiding said member.

6. In a truck brake equipment, the combination with a truck frame having side members, of a system of operatively connected brake elements carried by the truck frame and including a live brake lever, a brake cylinder device secured to one of said side members, a brake cylinder lever pivotally mounted on the truck frame and operatively connected at one end to the live lever, a pull rod operatively connected to the other end of said brake cylinder lever, a member pivotally connected to said pull rod and to said brake cylinder device for operating the pull rod, and means on the brake cylinder device for guiding said member.

7. In a truck brake equipment, the combination with a truck frame having side members, of a system of operatively connected brake elements carried by the truck frame and including a live brake lever, a brake cylinder device secured to one of said side members, a brake cylinder lever pivotally mounted on the truck frame and operatively connected at one end to the live lever, a pull rod operatively connected to the other end of said brake cylinder lever, a yoke surrounding said brake cylinder device and operatively connecting the brake cylinder device to said pull rod, and integral lugs on the brake cylinder for guiding said yoke.

8. In a truck brake equipment, the combination with a truck frame having side members, of a system of operatively connected brake elements carried by the truck frame and including a live brake lever, a brake cylinder device secured to one of said side members, a brake cylinder lever pivotally mounted on the truck frame and operatively connected at one end to the live lever, a pull rod operatively connected to the other end of said brake cylinder lever, a yoke surrounding said brake cylinder device and operatively connecting the brake cylinder device to said pull rod, and rollers mounted on the brake cylinder device supporting said yoke.

FRANCIS E. SCHWENTLER.